(12) United States Patent
Yoshimura et al.

(10) Patent No.: US 6,385,534 B1
(45) Date of Patent: May 7, 2002

(54) NAVIGATION APPARATUS (75) Inventors: Tomoyuki Yoshimura; Yuichi Abe, both of Tottori (JP)

(73) Assignees: Sanyo Electronic Co., Ltd., Osaka; Tottori Sany Electric Co., Ltd., Tottori, both of (JP)

( * ) Notice: Subject to any disclaimer, the term of this patent is extended or adjusted under 35 U.S.C. 154(b) by 0 days.

(21) Appl. No.: 09/711,455

(22) Filed: Nov. 13, 2000

Related U.S. Application Data (63) Continuation of application No. PCT/JP99/02570, filed on May 17, 1999.

(30) Foreign Application Priority Data

Jun. 18, 1998 (JP) .............................................. 10-171526
Jun. 30, 1998 (JP) .............................................. 10-184248

(51) Int. Cl.⁷ .............................................. G01C 21/00
(52) U.S. Cl. ...................... 701/208; 701/211; 701/214; 340/988; 340/995; 342/357.01
(58) Field of Search ................................ 701/208, 211, 701/213, 214; 342/357.01, 357.06, 357.13; 340/988, 995, 693.1, 693.2, 693.3

(56) References Cited

U.S. PATENT DOCUMENTS 6,007,372 A * 12/1999 Wood .......................... 439/502
6,087,952 A * 7/2000 Prabhakaran ............ 340/693.5

FOREIGN PATENT DOCUMENTS

| EP | 0675341 | 4/1995 |
| EP | 0805337 | 5/1997 |
| EP | 0782118 | 7/1997 |
| JP | 62102112 A | 5/1987 |
| JP | 63100777 | 6/1988 |
| JP | 64021316 A | 1/1989 |
| JP | 04204317 A | 7/1992 |
| JP | 06222125 A | 8/1994 |
| JP | 08035850 | 6/1996 |
| JP | 09033268 A | 2/1997 |

* cited by examiner

*Primary Examiner*—Yonel Beaulieu
(74) *Attorney, Agent, or Firm*—William E. Pelton, Esq.

(57) ABSTRACT

Navigation apparatus has a controller that performs map-matching in which present position detected by a position detector is checked against a road on a map. When a road on which the present position lies is found, the controller causes the apparatus to display a name of the road. When a road on which the present position lies is not found, the controller causes the apparatus to display area information indicative of the present position.

18 Claims, 7 Drawing Sheets

NAVIGATION APPARATUS

This application is a continuation of PCT International application No. PCT/JP99/02570, filed May 17, 1999, designating the United States of America, the contents of which are incorporated by reference into the present application.

TECHNICAL FIELD

The present invention relates to a navigation apparatus.

TECHNICAL BACKGROUND

Among navigation apparatus on the market is one, for example, disclosed in Laid-open Japanese Patent (KOKAI) No. 7-63570/1995, in which map-matching is performed to display where on a road the user is. That is, a check is made based on the present position determined by the GPS to determine whether a present position is on a road in a map, the road lying within a range of measurement error and being matched to the track of movement of a navigation apparatus or a vehicle on which the navigation apparatus is carried. Thus, if the present position found by the GPS is in fact on the road, the present position is displayed on the road.

Laid-open Japanese Patent (KOKAI) No. 8-35850/1996 has proposed displaying characters representative of the name of a road that coincides with a position determined by the GPS. This is useful because displaying character information allows the user to easily or quickly know where he is.

One of the problems associated with conventional navigation apparatus is that the name of a road may not be displayed, i.e., no character information on the present position is displayed. This occurs if a road on the map does not exist within a range of error in which a track of movement of the navigation apparatus can be determined, or if there is no data describing the name of a road that matches the track movement.

Another problem is associated with a portable navigation apparatus. The portable navigation apparatus can be carried around by the user, and also can be carried on an automobile or a bicycle. Such a navigation apparatus incorporates built-in batteries or is designed to receive electric power from an external power source through, for example, an electric power outlet (e.g., cigar lighter) of an automobile.

Usually, GPS has an error of about 20 m. When a user carries around a portable navigator, the GPS fails to detect the direction in which the user walks, because the apparatus does not move fast enough, i.e., the user does not walk as fast as the GPS can determine the direction of movement of the user with its designed accuracy. As a result, map-matching (effected on the basis of the track of movement of the apparatus) cannot be performed while the walker is walking.

Still another problem is that when the user is walking in an alley, through a park, or in an amusement park, the apparatus may erroneously determine that the user is walking on a nearby road.

An object of the present invention is to solve the aforementioned problems. The present invention provides a navigation apparatus having:
map information reproducing means that can reproduce road map information, road name information, and area information;
position detecting means that detects a present position;
display means that displays road map information and the present position;
controlling means that performs map-matching in which the present position detected by said position detecting means is checked against the road map information;
wherein when the map-matching finds a road on which the present position lies, the controlling means causes the display means to display a name of the road; and
wherein when said map-matching fails to find the road on which the present position lies, the controlling means causes the display means to display the area information in which the present position lies.

The present invention provides a navigation apparatus having:
map information reproducing means that can reproduce road map information, road name information, and area information;
position detecting means that detects a present position;
display means that displays the road map information and the present position;
controlling means that performs map-matching in which the present position detected by said position detecting means is checked against the road map information;
wherein when the map-matching fails to find road name information corresponding to the present position, the controlling means causes the display means to display the area information.

The present invention provides a portable navigation apparatus having:
an internal power supply;
a terminal through which electric power is received from an external power source;
map information reproducing means that reproducing map information;
position detecting means that detects a present position;
display means that displays the present position and road map information;
controlling means that performs map-matching in which the present position detected by said position detecting means is checked against the road map information;
external power supply detecting means that determines whether electric power is being supplied from an external power source;
wherein when said external power supply detecting means determines that electric power is being supplied from the external power source, said controlling means performs the map-matching; and
wherein when said external power supply detecting means determines that electric power is not supplied from the external power source, said controlling means does not perform the map-matching.

EMBODIMENT OF THE INVENTION

First Embodiment

Figure 1:
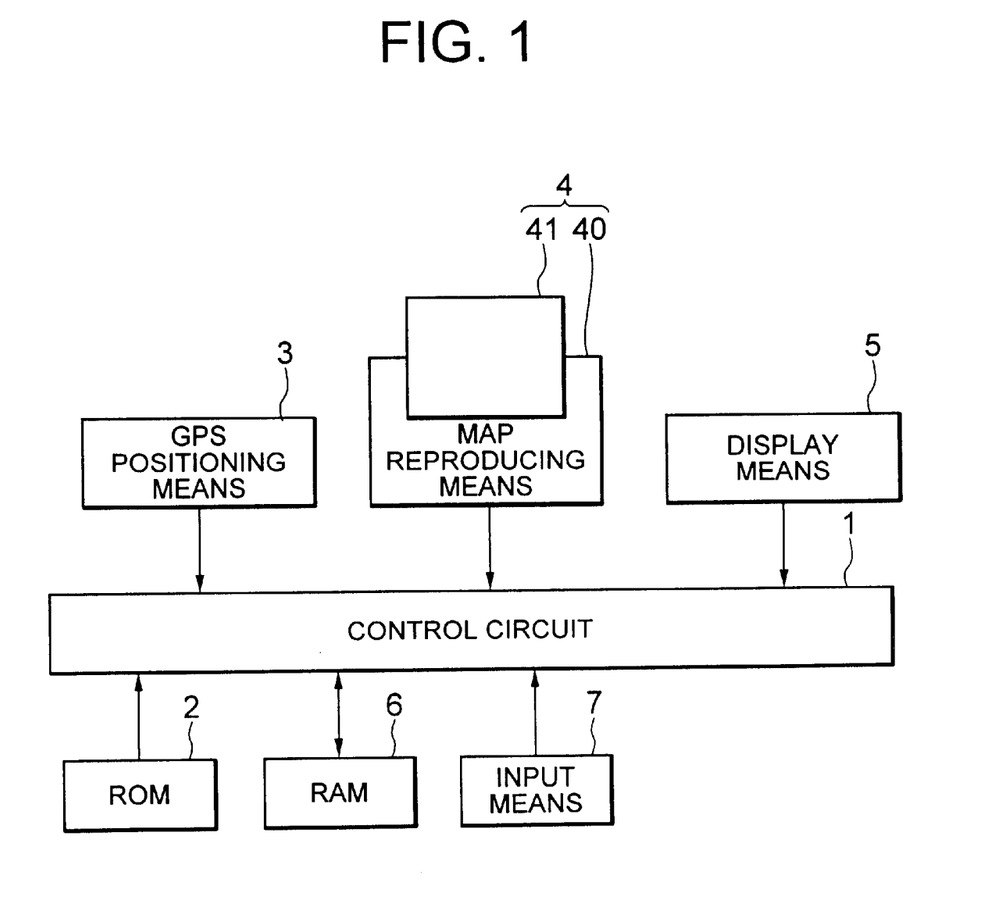
FIG. 1 is a block diagram illustrating a pertinent portion of a navigation apparatus according to an embodiment of the invention.

FIG. 1 illustrates a pertinent portion of a navigation apparatus according to an embodiment of the invention. The navigation apparatus has a control circuit 1 which operates in accordance with the programs stored in a ROM 2 to control the entire operation of the navigation apparatus.

A GPS apparatus 3 determines a present position based on the radio waves received from GPS satellites and supplies the measured data to the control circuit 1. When the navigation apparatus is first turned on, it takes several minutes to detect the present position but subsequent determinations of the present position can be done once every second.

The GPS uses a pseudo-random code as a synchronization timing for C/A code or P code to determine a time required for the transmission of the radio wave, thereby determining distances between the navigation apparatus and the GPS satellites. For about 90% of all measurements, distances can be determined within an error of less than 100 m. Errors are due to clock error of the satellites, orbital error of the satellite, delay time of radio wave traveling through the ionosphere, delay time of radio wave traveling through the tropospheric layer, noise generated in the receiver, multi-path of radio wave, and SA (selective availability).

In DGPS (differential global positioning system), a signal indicative of an error of the GPS radio wave is transmitted by means of an FM broad casting wave, the error of the GPS radio wave being measured at a reference position (GPS correction station) whose position is known. The navigation apparatus uses this signal to correct the error of the detected position. The resultant measurement error in the DGP is 1/10 of that measured by the GPS alone. The resultant measurement errors can be in the range from several millimeters to several centimeters if measurements are performed by KGPS (kinematic global positioning system) which is a carrier phase positioning. However, most of the navigation apparatus currently on the market are based on the GPS. Therefore, without map-matching (reference is made to Laid-open Japanese Patent No. 8-35850), the present position may not be displayed on a corresponding road but on the wrong location due to measurement errors, despite the fact that the vehicle is actually running on the road. Map-matching checks the present position against roads within a range of a predetermined error (e.g., 150 m) GPS. For example, the track of movement is checked against the road on the map, thereby finding the right road. If the right road is found, it is determined that the present position is on the road. Map information reproducing means 40 can accept a storage medium 41 such as a CD-ROM into which map information has been written. The map information reproducing means 40 reads the map information form the storage medium 41 and supplies the map information to a control circuit 1. The map information includes data of road map, names of roads, and area information. The area information includes the names of areas (e.g., name of town) and location information. The location information is information representative of specific locations such as parks, prominent buildings, and railway stations. In the following description, the term "area information representative of a present position" covers the name of an area or the name of a location that is displayed near the present position on the map. The map information reproducing means 40 and the storage medium 41 form map information storing means 4.

Display means 5 is in the form of a liquid crystal display, and displays a map, a present position and so on under the control of the control circuit.

A RAM 6 stores data required for the operation of the control circuit 1 including data that describes the present position, a starting point, a destination of a scheduled route, and transit points in the scheduled route, all of which being determined by GPS 3.

Input means 7 is used to scroll the display screen of a display 5, change the scale, and set scheduled routes, etc.

Figure 2:
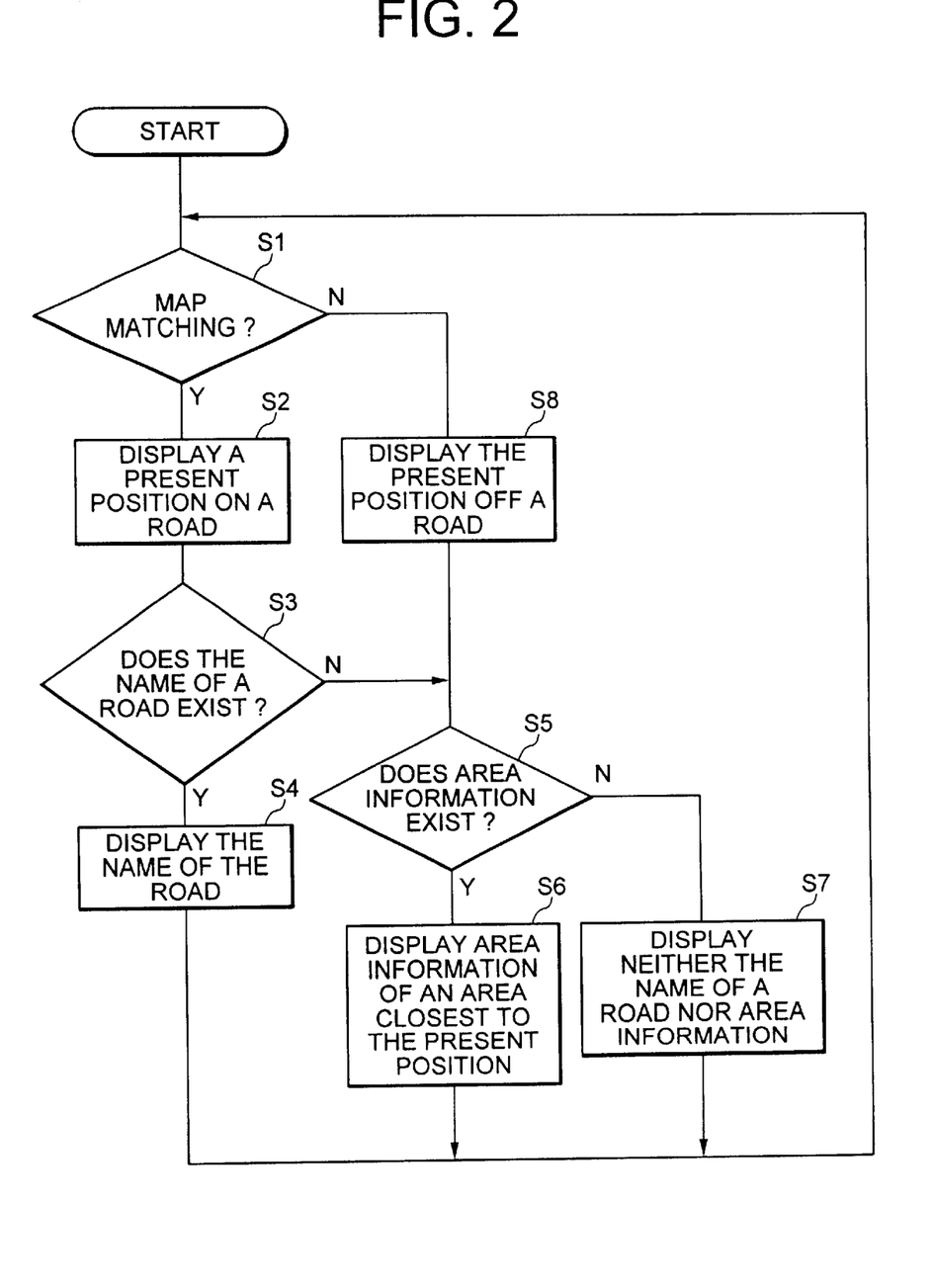
FIG. 2 is a flowchart illustrating the operation of a control circuit of FIG. 1.
Figure 3:
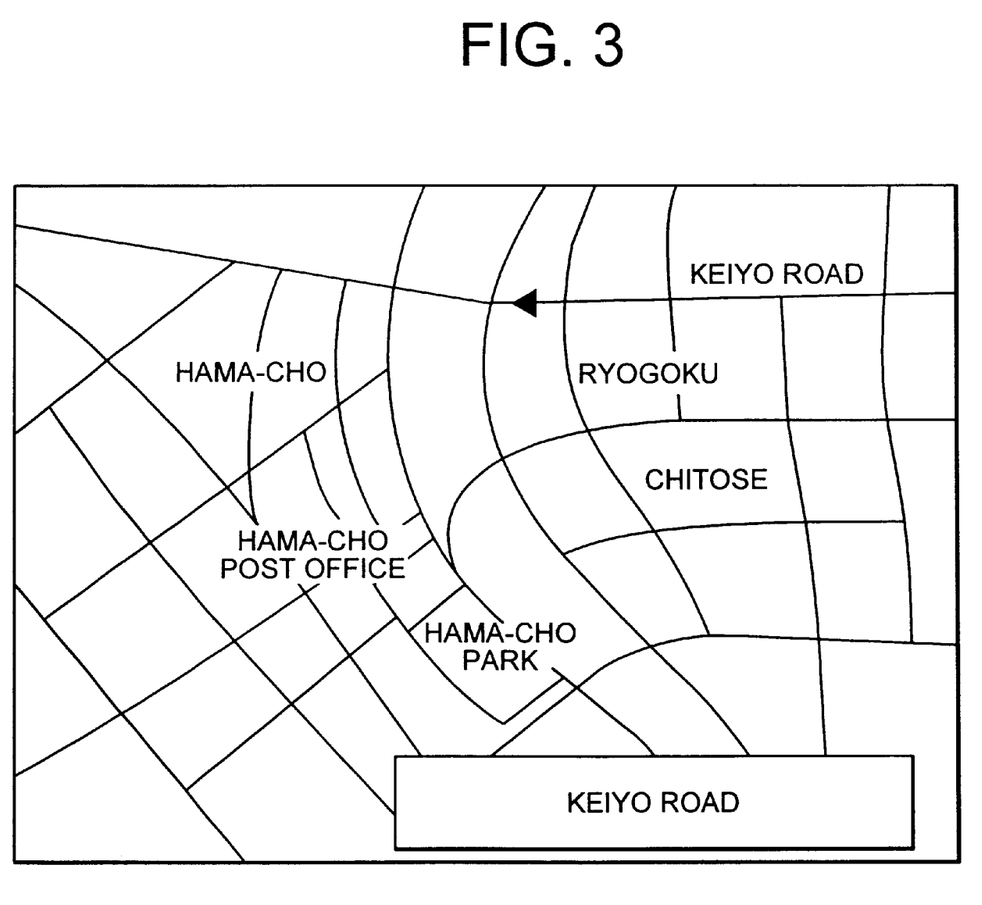
FIG. 3 illustrates a map and characters representative of the name of a road in which a present position lies.

The operation of the embodiment will be described with reference to the flowchart of FIG. 2. The control circuit 1 performs map matching to determine whether a present position detected by the GPS apparatus lies on a road of a map stored in the map information storing means (S1). If the answer is YES at step S1, it is determined that the present position is actually on the road, and the data representative of the present position is corrected. The present position data after correction is displayed as a present position on the display (S2). If the name of the road on which the present position lies has been stored in the map information storing means 4 (YES at step S3), then the control circuit 1 causes the display 5 to display characters representative of the name of the road (e.g., "KEIYO ROAD") as shown in FIG. 3 (S4). In FIG. 3, the characters appear at a predetermined region of the display screen such as a right bottom of the screen.

Figure 4:
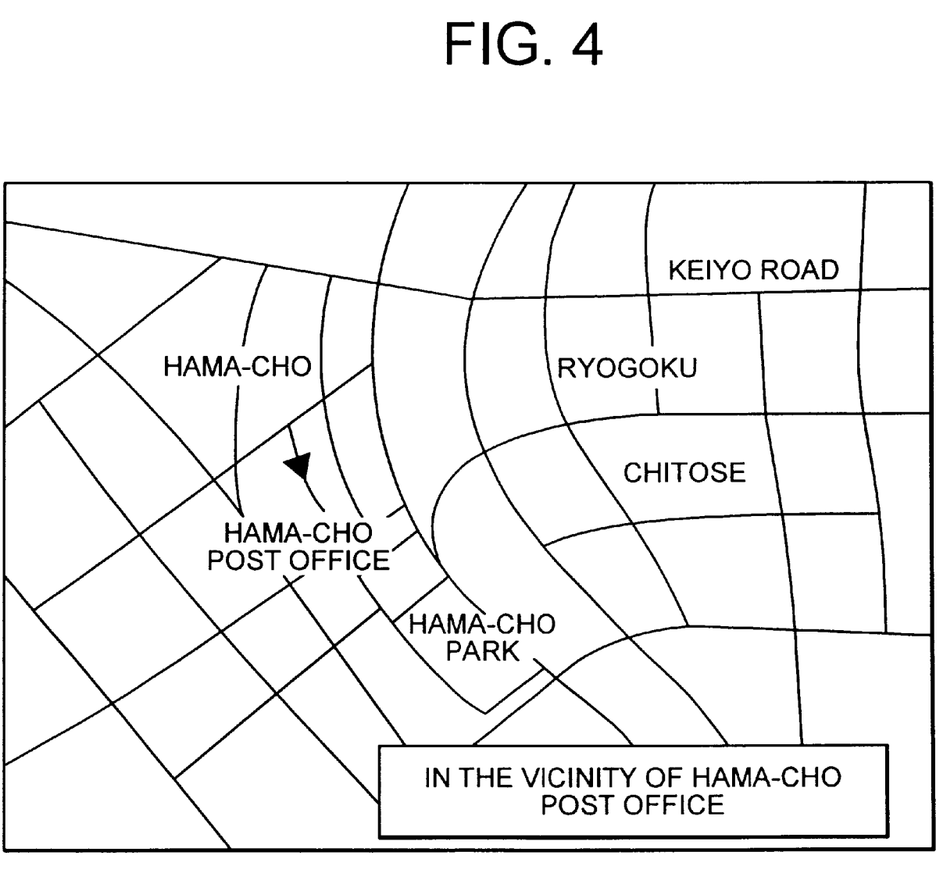
FIG. 4 illustrates a map and characters that represent an area.

If the name of the road has not been stored in the map information storing means 4 (NO at step S3), then a check is made to determine whether the map information storing means 4 has area information that exists within a predetermined range (e.g., within 1 km) from the present position (S5). If the answer is YES at step S5, then as shown in FIG. 4, characters representative of the area information is displayed. At this moment, characters "in the vicinity of" are added to the area information as required.

In FIG. 4, characters "in the vicinity of Hama-cho Postal Office" are displayed at a predetermined area on the screen.

When the name of an area or a location is to be selected, the apparatus may be designed to display the area or the location, whichever closest to the present position. Alternatively, the apparatus may be designed to display the area or the location taking into account the distance from the present position and degree of being known.

If it is determined that no area information is available at step S5, neither the name of a road nor the area information is displayed (S7).

Figure 5:
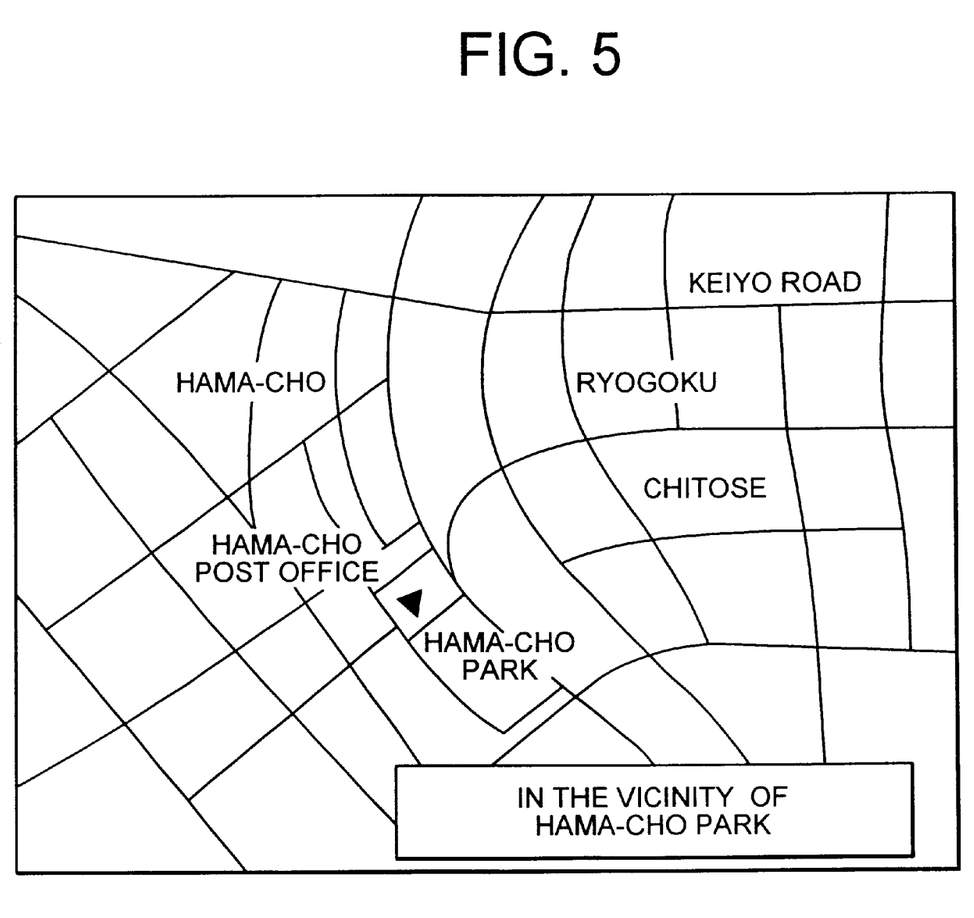
FIG. 5 illustrates a map and characters that represent an area.

If it is determined at step S1 that the present position does not lie on any one of roads in the map stored in the map information means 4, then the control circuit 1 does not correct the present position detected by the GPS apparatus. Instead, the control circuit 1 causes the display 5 to display the present position as detected by the GPS apparatus (S8). At step S5, area information representative of the present position is displayed as shown in FIG. 5 (S6). At this moment, at step S5, the characters "in the vicinity of" are added to the area information as required, so that, for example, characters "in the vicinity of Hama-cho Park" appear on the screen.

In the above described embodiment, "information representative of the present position" is actually the name of an area or a location that appears on a map near the present position. In stead, the name of an area in which the present position lies maybe displayed as the area information that represents the present position. Still alternatively, the name of a location close to the present position may be displayed as the area information that represents the present position.

For example, a string of characters representative of an area is displayed on the screen such that the top one of the characters is positioned relative to a predetermined position on the screen, the predetermined position being immediately left to and in an immediately below the string of characters. However, the string of characters may be displayed on the screen such that the top one of the characters appears at a convenient position on the screen.

Second Embodiment

Figure 6:
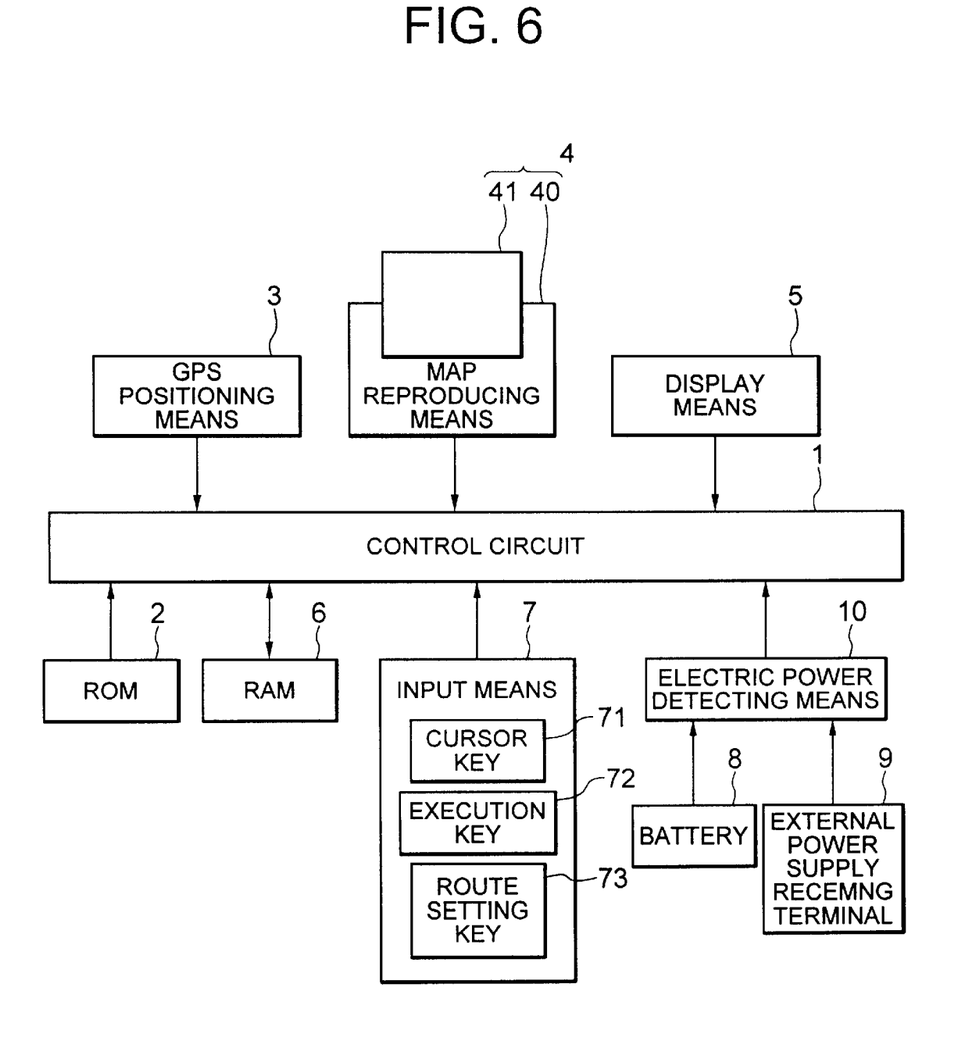
FIG. 6 is a block diagram illustrating a pertinent portion of a navigation apparatus according to another embodiment of the invention.

FIG. 6 illustrates a pertinent portion of a navigation apparatus according to another embodiment of the invention. Elements similar to those of FIG. 1 have been given the same reference numerals as those of FIG. 1.

The input means 7 includes a cursor key 71, execution key 72, and route-setting key 73. The cursor key 71 is used for scrolling the screen of the display 5 in one of eight directions. The execution key 72 is used for outputting data to the control circuit. The route setting key 73 is used for setting a scheduled route.

The apparatus according to this embodiment is of a portable type. When a user walks carrying the portable apparatus or rides a bicycle with the apparatus on the bicycle, a battery 8 is used as a power source. The apparatus has an external power supply receiving terminal 9, which is connected via a cable (not shown) to an electric power outlet (e.g., cigar lighter, not shown) usually provided on an automobile, not shown. Thus, the apparatus can also operate from an external power supply.

Electric power detecting means 10 determines whether the navigation apparatus is receiving electric power from an external power source, and informs the control circuit 1 of the determination result. In other words, the electric power detecting means 10 determines whether the cable for connecting between the apparatus and, for example, the cigar lighter is actually connected to the external power supply receiving terminal 9.

Figure 7:
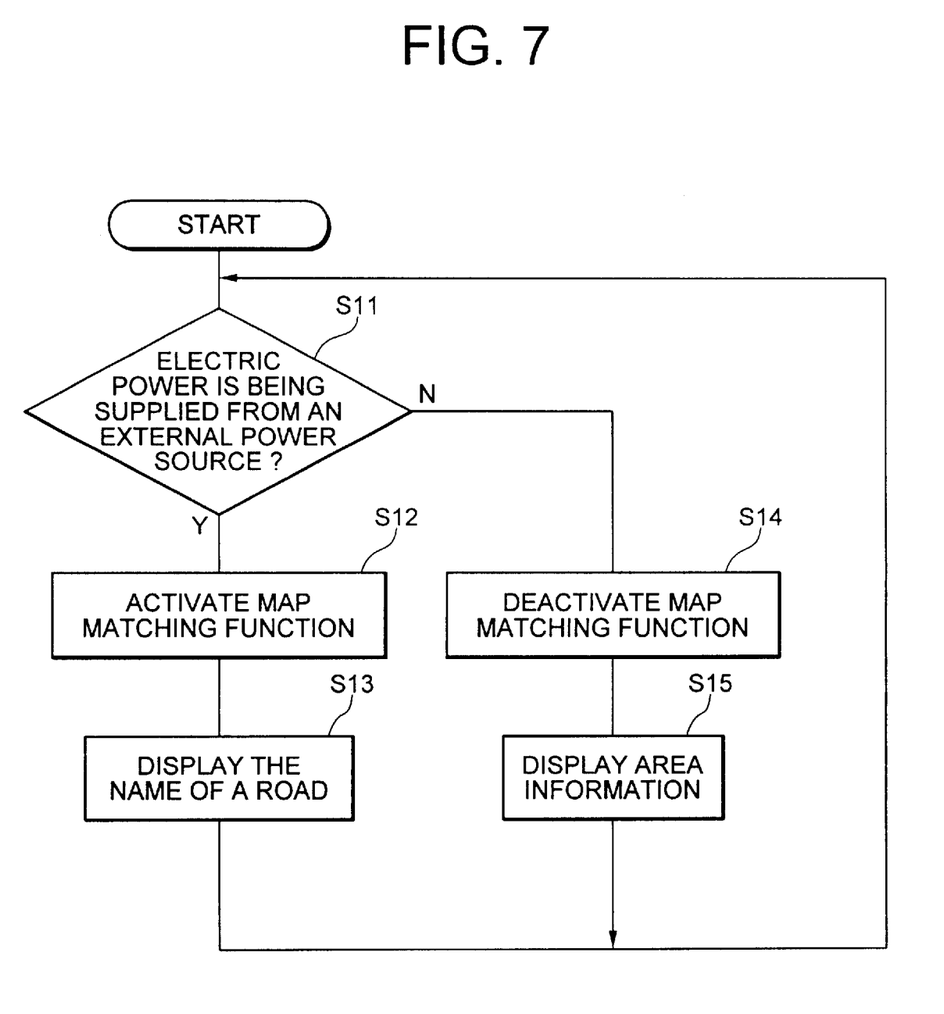
FIG. 7 is a flowchart illustrating the operation of the control circuit of FIG. 6.

The operation of the embodiment will now be described with reference to the flowchart of FIG. 7. When it is determined that electric power is being supplied from an external power source (i.e., cigar lighter) (YES at step S11), the control circuit 1 determines that the navigation apparatus is carried on an automobile and performs map-matching (S12). Then, the control circuit 1 causes the display 5 to display the name of a road that represents the present position.

If it is determined that electric power is not being received from an external power source (NO at step S11), then the control circuit 1 does not perform map matching (S14), and causes the display 5 to display the area information representative of the present position (S15).

According to the aforementioned embodiment, if the electric power is not being received from an external power source, then the control circuit 1 determined that the navigation apparatus is not carried on an automobile. For example, when the user carries around the navigation apparatus or rides a bicycle with the apparatus carried thereon, the movement speed of the navigation apparatus is not so fast as the GPS can detect. Thus, it is difficult to detect the direction of movement of the navigation apparatus. For calculation in map-matching, it is required to know the direction of movement of the navigation apparatus. This is necessary because the route or path of movement of navigation apparatus is compared with roads on a map. As a result, when the user is walking or riding the bicycle, it is difficult to carry out accurate map-matching. Thus, map-matching is not carried out when electric power is not being supplied from an external power source.

When there are a plurality of roads near the detected present position, the map-matching tends to choose a wider road or a highway. For example, when the navigation apparatus is carried on a bicycle and the bicycle is travelling along a narrow alley parallel to a national highway, a conventional navigation apparatus tends to determine that the present position lies on the national highway. In such a case, the map matching is not carried out in this embodiment and accordingly there is no chance of such an error of being encountered.

Moreover, the navigation apparatus is off road more often when the navigation apparatus is carried by the user or on the bicycle than when the navigation apparatus is carried on an automobile. Thus, for example, if the navigation apparatus is within a park, the name of the park is displayed rather than the name of a nearby road.

INDUSTRIAL APPLICABILITY

As mentioned above, according to the first embodiment, when the present position does not lie on any one of roads on the map, the area information representative of the present position is displayed instead of the name of a corresponding road. For example, when an automobile with a navigation apparatus carried thereon enters an alley not identified on the map, or when the automobile is within a parking area, the present position does not lie on a road in a map. However, the user can still be informed of the present position by the characters, displayed on the screen, representative of the place. In addition, adding the characters "in the vicinity of" allows the user to properly know that the present position is not the location itself indicated by the area information but in the vicinity of the location.

When the present position lies on a road shown on the map but the name of the road is not displayed, e.g., when the name of the road does not exist or when the name of the road has not been stored in the map information means, characters representative of the area information on the present position can still be displayed.

According to the second embodiment, when the navigation apparatus is carried on something other than an automobile, e.g. when the navigation apparatus is carried by the user or on the bicycle, the apparatus prevents the present position from being displayed on the wrong road in the map, or the wrong name of road from being displayed.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A navigation apparatus comprising:

a map information reproducing section that reproduces road map information, road name information, and area information;

a position detecting section that detects a present position;

a display section that displays the road map information, the road name information, the area information, and the present position;

a controlling section that performs map-matching in which the present position detected by said position detecting section is checked against the road map information to detect a road on which the present position lies;

wherein when said controlling section detects the road, said controlling section causes said display section to display a name of the road; and wherein when said controlling section fails to detect the road, said controlling section causes the display section to display the area information indicative of an area in which the present position lies.

2. The navigation apparatus according to claim 1, wherein the area information includes at least one of a name of an area and a name of a location.

3. The navigation apparatus according to claim 2, wherein the location includes at least one of a park, a building, and a railway station.

4. The navigation apparatus according to claim 1, wherein said control section carries out the map matching by checking a route of movement of the navigation apparatus against the road map information.

5. The navigation apparatus according to claim 2, wherein said control section causes said display section to display a character indicating that the present position is near the location.

6. A navigation apparatus comprising:
- a map information reproducing section that reproduces road map information, road name information, and area information;
- a position detecting section that detects a present position;
- a display section that displays the road map information, the road name information, the area information, and the present position;
- a controlling section that performs map-matching in which the present position detected by said position detecting section is checked against the road map information to detect a road on which the present position lies;
- wherein when the map-matching fails to find a name of the road, the controlling section causes the display section to display the area information instead of the name of the road.

7. The navigation apparatus according to claim 6, wherein when the present position is not found to lie on any road, said control section causes the display section to display the area information.

8. The navigation apparatus according to claim 6, wherein when it is determined that the present position lies on a road but the road has not a name or when said map information reproducing section fails to reproduce the name of the road, said control section causes the display section to display t he area information.

9. The navigation apparatus according to claim 6, wherein the area information includes at least one of a name of an area and a name of a location.

10. The navigation apparatus according to claim 9, wherein the location includes at least one of a park, a building, and a railway station.

11. The navigation apparatus according to claim 6, wherein said control section carries out map matching by checking a route of movement of the navigation apparatus against the road map information.

12. The navigation apparatus according to claim 6, wherein said control section causes said display section to display a character indicating that the present position is near the location.

13. A portable navigation apparatus comprising:
- an internal power supply;
- a terminal through which electric power is received from a battery of an automobile;
- an external power supply detecting section that determines whether electric power is being supplied from the battery;
- a map information reproducing section that produces road map information;
- a position detecting section that detects a present position;
- a display section that displays the present position detected by said position detecting section and the road map information reproduced by said map information reproducing section;
- a controlling section that performs map-matching in which the present position is checked against the road map information;
- wherein when said external power supply detecting section determines that electric power is being supplied from the battery, said controlling section performs the map matching; and
- wherein when said external power supply detecting section determines that electric power is not being supplied from the battery, said controlling section does not perform the map-matching.

14. The portable navigation apparatus according to claim 13, wherein said map information reproducing section further reproduces road name information and area information;
- wherein when said external power supply detecting section determines that electric power is being supplied from the battery, said control section causes the display section to display a name of a road on which the present position lies;
- wherein when said external power supply detecting section determines that electric power is not being supplied from the battery, said control section causes the display section to display the area information representative of the present position.

15. The portable navigation apparatus according to claim 13, wherein the area information includes at least one of a name of an area and a name of a location.

16. The navigation apparatus according to claim 15, wherein the location includes at least one of a park, a building, and a railway station.

17. The navigation apparatus according to claim 13, wherein said control section carries out map matching by checking a route of movement of the navigation apparatus against the road map information.

18. The navigation apparatus according to claim 13, wherein said control section causes said display section to display a character indicating that the present position is near the location.

* * * * *